(12) United States Patent
Yang et al.

(10) Patent No.: US 8,917,956 B1
(45) Date of Patent: Dec. 23, 2014

(54) ENHANCING SPATIAL RESOLUTION OF AN IMAGE

(75) Inventors: Qingxiong Yang, Urbana, IL (US); Kar-Han Tan, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1534 days.

(21) Appl. No.: 12/540,211

(22) Filed: Aug. 12, 2009

(51) Int. Cl.
*G06K 9/32* (2006.01)
*G09G 5/02* (2006.01)
*H04N 9/74* (2006.01)

(52) U.S. Cl.
USPC ........... 382/299; 382/293; 382/294; 382/298; 382/300; 348/580; 348/581; 345/698

(58) Field of Classification Search
USPC .......... 382/293, 294, 298, 299, 300; 348/580, 348/581; 345/698
See application file for complete search history.

(56) References Cited

U.S. PATENT DOCUMENTS

| | | | | |
|---|---|---|---|---|
| 5,983,251 | A * | 11/1999 | Martens et al. | 708/203 |
| 2003/0206652 | A1* | 11/2003 | Nister | 382/154 |
| 2006/0056679 | A1* | 3/2006 | Redert et al. | 382/154 |
| 2006/0221250 | A1* | 10/2006 | Rossbach et al. | 348/630 |
| 2007/0024614 | A1* | 2/2007 | Tam et al. | 345/419 |
| 2011/0208685 | A1* | 8/2011 | Ganapathi et al. | 706/52 |

OTHER PUBLICATIONS

J. Diebel and S. Thrun, "An application of markov random fields to range sensing," in NIPS, 2005.*
Q Yang, L Wang, R Yang, S Wang, M Liao, D Nister, "Real-time Global Stereo Matching Using Hierarchical Belief Propagation" BMVC 6, 989-998.*
Yang, Qingxiong et al., "Spatial-Depth Super Resolution for Range Images", *CVPR*,(2007),1-8.
Kopf, Johannes et al., "Joint Bilateral Upsampling", *ACM Transactions on Graphics. Proceedings of SIGGRAPH* 2007 vol. 26 No. 3, (2007).

* cited by examiner

*Primary Examiner* — Matthew Bella
*Assistant Examiner* — Jose M Torres
(74) *Attorney, Agent, or Firm* — Wagner Blecher, LLP; John Wagner (57) ABSTRACT

A method of enhancing spatial resolution of an image. An image is accessed. The image comprises a set of confident pixels and an unconfident pixel positioned adjacent to each confident pixel of the set of confident pixels. The set of confident pixels comprises four or fewer pixels and corresponds to a plurality of known depth values, the unconfident pixel comprises an unknown depth value. A best depth hypothesis for the unconfident pixel is determined using a filter module in which the plurality of known depth values are used as depth hypotheses. The unconfident pixel is updated as a confident pixel using the best depth hypothesis.

20 Claims, 5 Drawing Sheets

ENHANCING SPATIAL RESOLUTION OF AN IMAGE

FIELD

Embodiments of the present technology relate generally to the field of image processing.

BACKGROUND

There exists a variety of range measuring technologies to acquire three dimensional information about the world. For example, laser range scanners can provide extremely accurate and dense three dimensional measurements over a large working volume. However, most of these high-quality scanners measure a single point at a time, limiting their applications to static environments only. The options to capture depth at video rates are rather limited; the main contender, stereo vision, is known to be quite fragile in practice. Recently, new sensors have been developed to overcome this limitation. However, these sensors generally are only able to provide low resolution images.

BRIEF DESCRIPTION OF THE DRAWINGS

The accompanying drawings, which are incorporated in and form a part of this specification, illustrate embodiments of the present technology for a system for enhancing spatial resolution of an image, together with the description, serve to explain principles discussed below.

DESCRIPTION OF EMBODIMENTS

Reference will now be made in detail to embodiments of the present technology, examples of which are illustrated in the accompanying drawings. While the present technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of embodiment of the present technology. However, embodiments of the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "accessing", "determining", "updating", "repeating", "increasing", "comparing", "selecting", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview

Embodiments in accordance with the present technology pertain to a system for enhancing spatial resolution of an image. In one embodiment, a low-resolution depth image comprising a number of pixels with known values is up-sampled to include even more pixels with unknown values. A bilateral filter is used to determine a pixel's unknown value by using the known values of four or fewer pixels adjacent to the pixel with the unknown value. A new image, including all of the pixels with known values and the remaining pixels with unknown values, is then generated. This method is repeated until all of the unknown values for pixels within the low resolution depth image become known.

By reducing both the space and depth searching, this method reduces computational load requirements. For example, this method enables the spatial resolution of a depth image to be enhanced from 160×120 to 640×480 (enhanced 16 times) at real-time video rates.

Example System for Enhancing Spatial Resolution of an Image

Figure 1:
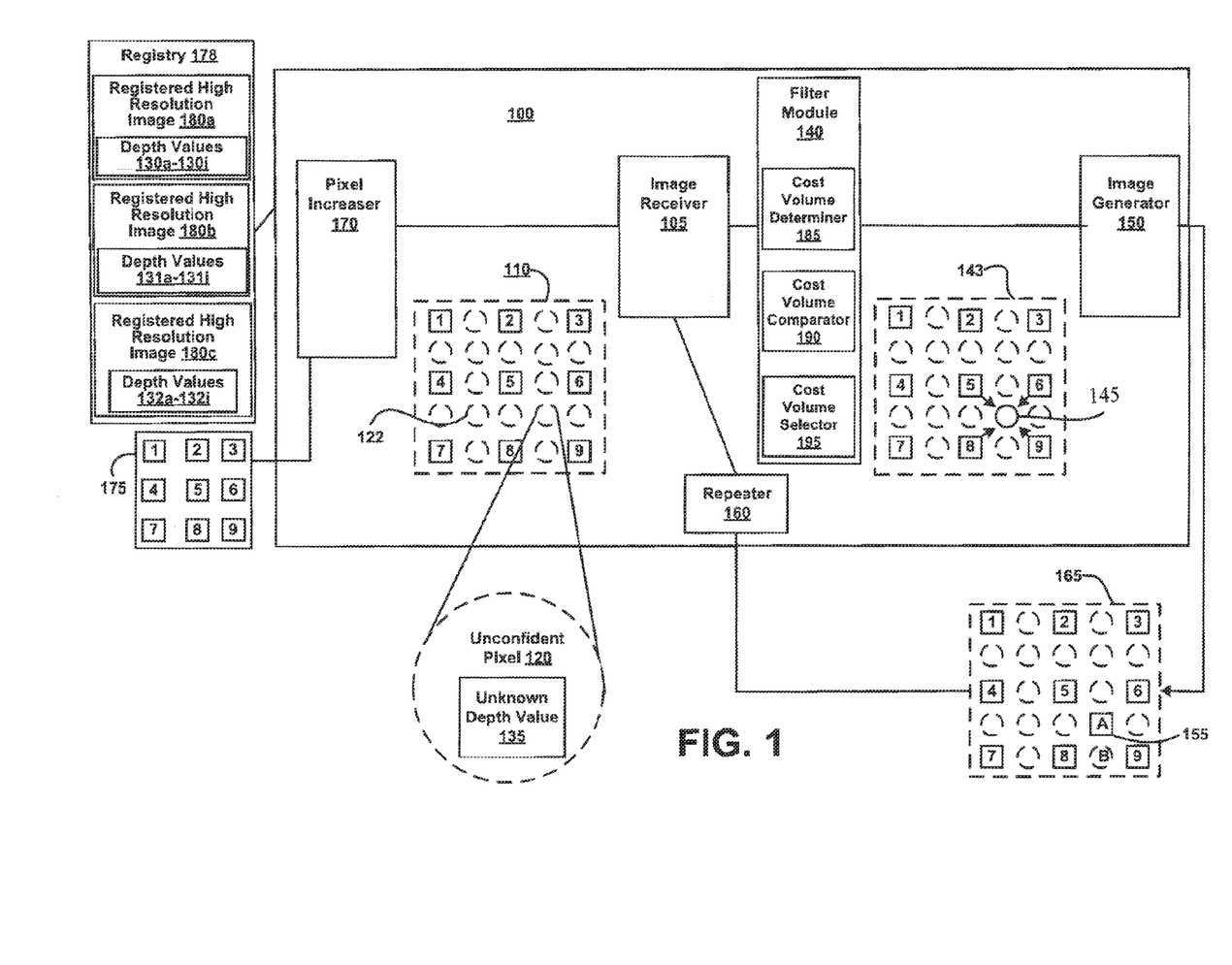
FIG. 1 is a block diagram of an example system for enhancing spatial resolution of an image, in accordance with embodiments of the present technology.

FIG. 1 is a block diagram of an example system 100 for enhancing spatial resolution of an image. System 100 includes image receiver 105, filter module 140, and image generator 150. In further embodiments, system 100 includes repeater 160 and pixel increaser 170. In even further embodiments, filter module 140 includes cost volume determiner 185, cost volume comparator 190 and cost volume selector 195.

Referring still to FIG. 1, in one embodiment system 100 is coupled, wired or wirelessly, with registry 178, which comprises registered high resolution images 180a, 180b and 180c. Registered high resolution image 180a, 180b and 180c comprise depth values 130a-130i, 131a-131i and 132a-132i, respectively. It should be appreciated that registered high resolution images 180a, 180b and 180c may reside in different registries or independent of a registry. While three registered high resolution images 180a, 180b and 180c are shown in registry 178, it should also be understood that registry 178 may include any number of registered high resolution images.

FIG. 1 includes a plurality of images, such as low resolution depth image 175, up-sampled low resolution depth image 110, spatially filtered low resolution depth image 143 and updated depth image 165. In one embodiment, low resolution depth image 175 comprises pixels as represented by the squares 1, 2, 3, 4, 5, 6, 7, 8 and 9 that have known depth values (hereinafter, "confident pixels 1-9"). The depth values are known in that a registry 178 accessible by system 100 comprises registered high resolution images with defined depth values that correspond to the low resolution depth images. For example, system 100 may access registry 178 to find the depth values of the confident pixels 1-9 of resolution depth image 175. In this example, system 100 may find that the depth values 130a-130i of registered high resolution image 180a correspond to pixels 1-9 of low resolution depth image 175.

Referring to FIG. 1, in one embodiment, up-sampled low resolution depth image 110 comprises confident pixels 1-9 and pixels without known values, or "unconfident pixels", represented by the circles. For example, unconfident pixel 120 comprises unknown depth value 135. Additionally, in one embodiment, spatially filtered low resolution depth image 143 comprises confident pixels 1-9 and unconfident pixels including unconfident pixel 145. Unconfident pixel 145's value may be deciphered from adjacent confident pixels 5, 6, 8 and 9 via spatial filtering. Moreover, in one embodiment, updated depth image 165 comprises confident pixels 1-9 and recently updated confident pixel A, as well as the unconfident pixels represented by the circles.

Referring still to FIG. 1, in one embodiment, image receiver 105 is configured to receive an image comprising a set of confident pixels and an unconfident pixel positioned adjacent to each of confident pixel of said set of confident pixels. The set of confident pixels comprise four or fewer confident pixels, such as confident pixels 5, 6, 8 and 9 of up-sampled low resolution depth image 110. Another set of confident pixels may be confident pixels 4, 5, 7 and 8, all of which are positioned adjacent to unconfident pixel 122. Of note, a set of confident pixels is not limited to the example given herein using confident pixels 4, 5, 7 and 8 as the set. The set of confident pixels may be any set of pixels, comprising four or fewer pixels that are positioned adjacent to the same unconfident pixel.

In one embodiment, one type of filtering neighborhood of pixels may be described as a set of confident pixels overlapping another set of confident pixels. For example, confident pixels 5 and 6 are common to both sets of confident pixels 5, 6, 8 and 9 and 4, 5, 7 and 8. Thus, these two sets overlap via confident pixels 5 and 6. As will be described in the "Operation" section below, other types of filtering neighborhoods of pixels are also used while determining a value for the unconfident pixels.

Example Operation of a System for Enhancing Spatial Resolution of an Image

More generally, in embodiments in accordance with the present technology, system 100 is utilized to enhance the spatial resolution of a depth image provided by time-of flight sensors at video rates. This is advantageous because by reducing both the space and depth searching range during spatial filtering, the computation load requirements are reduced.

Referring to FIG. 1, in one embodiment pixel increaser 170 increases a sampling quantity of pixels of image 175 comprising confident pixels. For example, pixel increaser 170 increases the sampling quantity of pixels 1, 2, 3, 4, 5, 6, 7, 8 and 9 of image 175 (that is a low resolution depth image) to include unconfident pixels, such as those shown as circles in up-sampled low resolution depth image 110.

Referring still to FIG. 1, in one embodiment, image receiver 105 receives an image comprising a set of confident pixels 5, 6, 8 and 9 and an unconfident pixel 120. Each set of confident pixels comprises four or fewer confident pixels and corresponds to a plurality of known depth values, such as four or fewer depth values. Unconfident pixel 120 comprises an unknown depth value. Additionally, in one embodiment, the image received is an up-sampled low resolution depth image 110. In another embodiment, the image received is updated image 165. Image receiver 105 receives this image via wire or wireless communication.

For example, a set of confident pixels may comprise confident pixels 5, 6, 8 and 9 of up-sampled low resolution depth image 110. These confident pixels 5, 6, 8 and 9 are positioned adjacent to unconfident pixel 120 having unknown depth value 135.

Referring still to FIG. 1, filter module 140 determines a best depth hypothesis 145 for unconfident pixel 120 in which the plurality of known depth values are used as depth hypotheses. For example, the plurality of known depth values for the set of confident pixels 5, 6, 8 and 9 may be depth values 130a, 130b, 130c and 130d of registered high resolution image 180a. In one embodiment, system 100 accesses registry 178 via wire or wirelessly. In another embodiment, system 100 comprises registry 178. As will be explained herein, in one embodiment, filter module 140 is a joint bilateral filter.

A bilateral filter is an edge-preserving filter that generally contains a spatial filter kernel and a range filter kernel. Denote p as a pixel in an image, q as another pixel in the neighborhood N(p) of p, I(p) and I(q) as the corresponding range values of pixels p and q, the filtered range value of p is:

$$J(p) = \frac{\sum_{q \in N(p)} F(p, q) \cdot G(I(p), I(q)) \cdot I(q)}{\sum_{q \in N(p)} F(p, q) \cdot G(I(p), I(q))} \qquad \text{Equation 1}$$

where F and G are the spatial and range filter kernels, respectively. If the range filter kernel is computed based on another image I' where the range values of pixels p and q are I'(p) and I'(q), the filtered range value of pixel p for image I is then $$J'(p) = \frac{1}{\sum_{q \in N(p)} F(p, q) \cdot G(I'(p), I'(q))} \qquad \text{Equation 2}$$

$$\sum_{q \in N(p)} F(p, q) \cdot G(I'(p), I'(q)) \cdot I(q)$$

The resulting filter is called a joint bilateral filter, which enforces the texture of filtered image J' to be similar to image I'.

The range filter kernel of the joint bilateral filter is created from a color image registered with the depth image. Additional color information is used to estimate the miss-sampled depth values in the depth image based on the assumption that the world surfaces are locally smooth and the depth discontinuities generally correspond to color discontinuities.

Currently, one of the simplest approaches to employing a joint bilateral filter to up-sample a low resolution depth image is to use a nearest neighbor method, and then to use a registered color image for joint bilateral filtering the up-sampled low resolution depth image. However, this approach is problematic because the depth values around occlusions will become over smoothened. One method of solving this problem is to build a cost vector containing penalty values for assigning depth hypotheses to each pixel in the up-sampled image. A joint bilateral filter is then used for denoising each pixel independently. Next, the depth hypothesis with the smallest penalty value is selected as being correct as applied to each pixel.

However, this "solution" is also problematic; since the total number of depth hypotheses needs to be very large in order to preserve the depth accuracy, it is very slow. Also, the computational cost of the joint bilateral filter is very high because the running time is non-linear to the filter size.

Embodiments of the present technology overcome these problems by extending the method shown in equations 1 and 2 with a hierarchical up-sampling framework. For example, for each resolution scale, the number of depth hypotheses (of four or fewer different confident pixels) to be considered for each unconfident pixel is four or fewer. The computational cost of using a joint bilateral filter is greatly reduced since the method starts with low resolution depth and color images, and then the updated information is hierarchically propagated, via repeater 160, to the high-resolution depth and color images. Therefore, the filter size is relatively smaller than that generally used by a joint bilateral filter.

Referring to FIG. 1, in one embodiment of the present technology, filter module 140 comprises cost volume determiner 185, cost volume comparator 190 and cost volume selector 195. In one embodiment, cost volume determiner 185 determines a plurality of cost volumes corresponding to the set of confident pixels utilizing depth hypotheses. Cost volume comparator 190 compares the plurality of cost volumes with each other. Then, cost volume selector 195 selects a depth hypothesis associated with the smallest cost volume of the plurality of cost volumes as a best depth hypothesis estimate for the unconfident pixel.

For example, the up-sampled pixels are formulated mathematically. Denote $D_i$ as the up-sampled low resolution depth image using nearest neighbor method at scale I, $C_i \in \{0,1\}$ as a binary confidence map associated with $D_i$, $I_i$ as the registered color image, p as a pixel in $D_i$, and q as another pixel in the neighborhood N(p) of p, the joint bilateral up-sampling problem can then be expressed as:

$$D_i^{new}(p) = \underset{d \in R}{\operatorname{argmin}} \frac{\sum_{q \in N(p)} F(p, q) \cdot W_i(p, q) \cdot |d - D_i(q)|}{\sum_{q \in N(p)} F(p, q) \cdot W_i(p, q)} \quad \text{Equation 3}$$

where $$W_i(p,q) = G(I_i(p), I_i(q)) \cdot C_i(q) \quad \text{Equation 4}$$

is the confidence based range filter kernel, R is a vector of depth hypotheses (R is all possible depth hypotheses corresponding to the four or fewer of the confident pixels adjacent to the unconfident pixel for which $D_i^{new}$ is to be determined), and $V_i(q,d) = |d - D_i(q)|$ is the penalty values for assigning the depth hypothesis d∈R to pixel q (where d is one of the four or fewer possible depth hypotheses that is the best depth hypothesis). The updated depth image $D_i^{new}$ is then up-sampled using the nearest neighbor method and fed to the next scale for further refinement.

Embodiments of the present technology reduce the total number of depth hypotheses for each unconfident pixel to be equal to or less than four. For example and with reference to FIG. 1, filter module 140, via equations 3 and 4 above, determines a best depth hypothesis for unconfident pixel 120 in which the plurality of known depth values of confident pixels 5, 6, 8 and 9 are used as depth hypotheses. These depth hypotheses are used as "d" in the cost volume, $|d - D_i(q)|$, of equation 3 herein. The resultant cost volumes are compared with each other. The depth hypothesis rendering the smallest cost value is selected as the best estimate for unconfident pixel 120.

It should be appreciated that while spatially filtered up-sampled low resolution depth image 143 only shows the determination of a best depth hypothesis for unconfident pixel 120, more than one unconfident pixel may receive such a determination relatively simultaneously.

Referring still to FIG. 1, in one embodiment, image generator 150 updates unconfident pixel 120 as confident pixel A of updated image 165 using the best depth hypothesis determined by filter module 140. For example, image generator 150 updates unconfident pixel 120 of spatially filtered low resolution depth image 143 as confident pixel A of updated image 165.

Referring to FIG. 1, repeater 160 accesses updated image 165 and causes the receiving, determining, and the updating described herein to be repeated on updated image 165. For example, repeater 160 causes the depth values of confident pixels 8, 9 and A adjacent to unconfident pixel B to be used to determine the depth value of unconfident pixel B, via image receiver 105, filter module 140 and image generator 150.

Figure 2A:
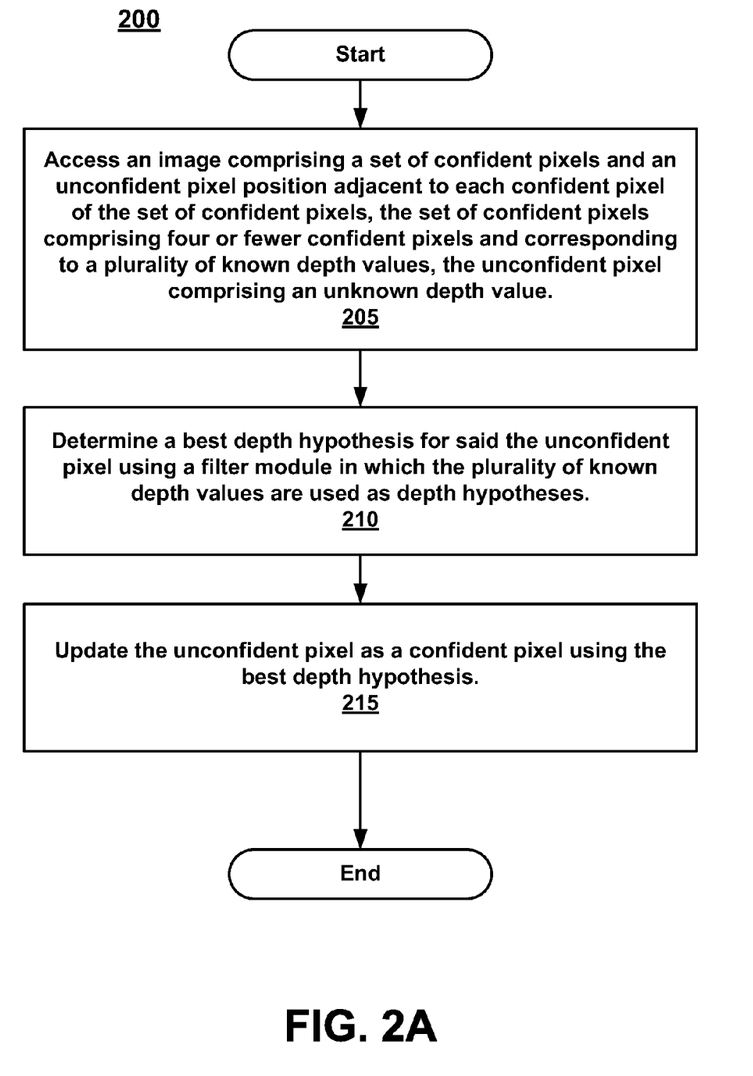
FIG. 2A is a flowchart of an example computer implemented method for enhancing spatial resolution of an image, in accordance with embodiments of the present technology.

Referring now to 200 of FIG. 2A, a flowchart of an example computer-implemented method for enhancing spatial resolution of an image, in accordance with embodiments of the present technology is shown.

Referring to 205 of FIG. 2A and as described herein, in one embodiment of the present technology, image 110 is accessed, wherein image 110 comprises a set of confident pixels and an unconfident pixel positioned adjacent to each confident pixel of the set of confident pixels is accessed. The set of confident pixels comprises four or fewer confident pixels and corresponds to a plurality of known depth values. The unconfident pixel comprises an unknown depth value.

Referring to 210 of FIG. 2A and as described herein, in one embodiment of the present technology, a best depth hypothesis for the unconfident pixel is determined using a filter module in which the plurality of known depth values are used as depth hypotheses.

Referring to 215 of FIG. 2A and as described herein, in one embodiment of the present technology, the unconfident pixel is updated as a confident pixel using the determined best depth hypothesis of 210 above.

Figure 2B:
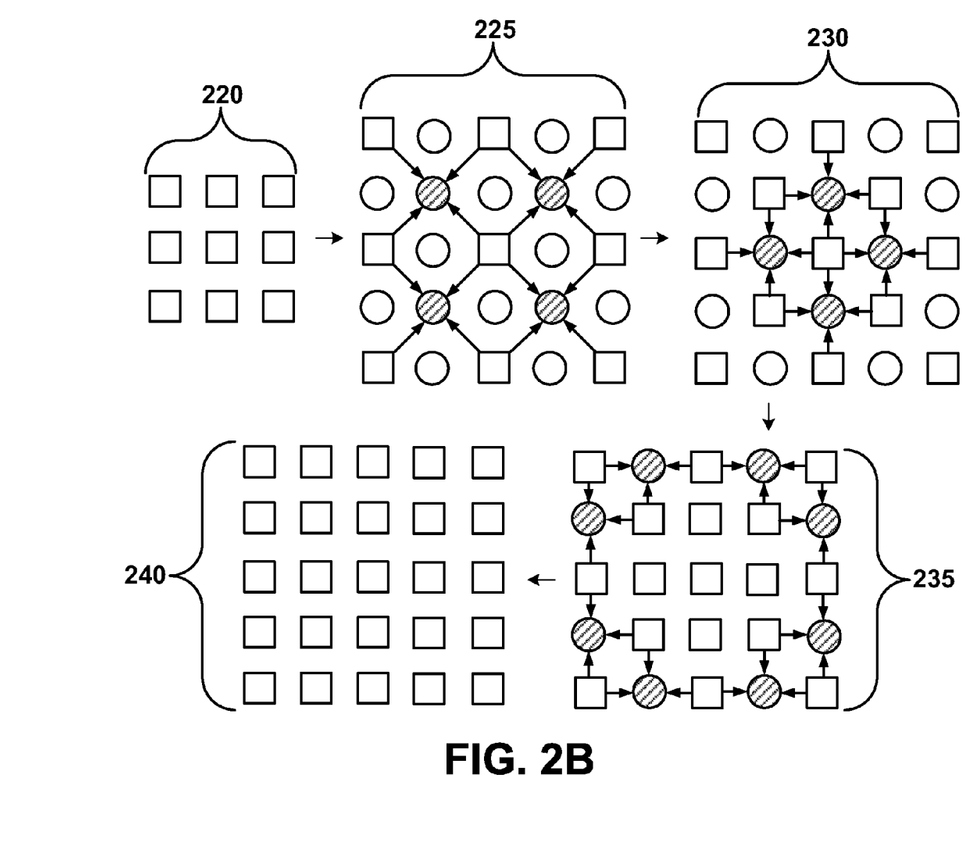
FIG. 2B is a block diagram of an overview of the results of an example method for enhancing spatial resolution of an image, in accordance with embodiments of the present technology.

Referring now to FIG. 2B, a block diagram of an overview of the results of an example method for enhancing spatial resolution of an image, as described in accordance with FIG. 2A, is shown in accordance with embodiments of the present technology.

Referring now to 220 of FIG. 2B, a depth image in coarse scale is shown. Referring now to 225 of FIG. 2B, an up-sampling of the depth image is shown. The unconfident pixels are represented as circles. The confident pixels with depth values sampling from the depth image of 220 are represented as squares.

Referring now to 225 and 230 of FIG. 2B, the depth values of the unconfident pixels (shown as circles with diagonal lines) of the up-sampled image shown in 225 that have four confident neighboring pixels are estimated (the estimation is represented by the pointing arrows from the neighboring confident pixels to the unconfident pixel) as shown in 225, and then marked as confident (represented by a square) in 230.

Referring to 230 and 235 of FIG. 2B, again, the depth values of more unconfident pixels (shown as circles with diagonal lines) of the up-sampled image shown in 225 that have four confident neighboring pixels are estimated (the estimation is represented by the pointing arrows from the neighboring confident pixels to the unconfident pixel) as shown in 230, and then marked as confident (represented by a square) in 235.

The remaining unconfident pixels that are left to be estimated are the edge pixels (circles with diagonal lines), as shown in 235. These unconfident edge pixels are also marked as confident after estimation as shown in 235. In this example, the unconfident edge pixels are eliminated in the last step. However, it may be appreciated that the unconfident edge pixels may be eliminated before other unconfident non-edge pixels are eliminated.

Referring now to 240 of FIG. 2B, every pixel in the image of 220 is shown to be marked as confident. Thus, 220, 225, 230, 235 and 240 provide a good overview of the process described in association with FIGS. 1, 2A and 2B.

Figure 3:
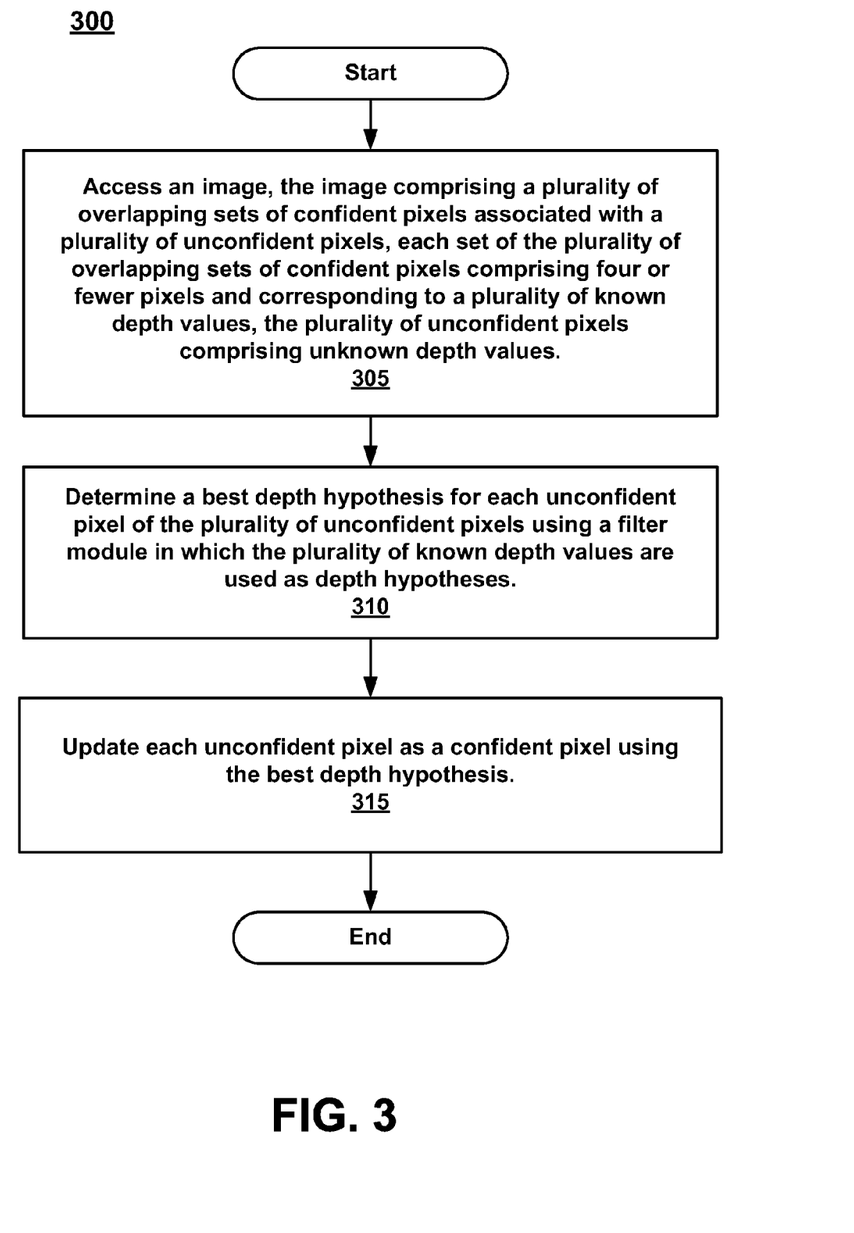
FIG. 3 is a flowchart of an example computer implemented method for enhancing spatial resolution of an image, in accordance with embodiments of the present technology.

FIG. 3 is a flowchart of an example method for enhancing spatial resolution of an image, in accordance with embodiments of the present technology. In one embodiment, process 300 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 300 is performed by system 100 of FIG. 1.

Referring to 305 and of FIG. 3, in one embodiment, an image is accessed, wherein the image comprises a plurality of overlapping sets of confident pixels associated with a plurality of unconfident pixels. Each set of the plurality of overlapping sets of confident pixels comprise four or fewer pixels and correspond to a plurality of known depth values. The plurality of unconfident pixels comprises unknown depth values.

Referring to 310 of FIG. 3, in one embodiment and as described herein, a best depth hypothesis for each unconfident pixel of the plurality of unconfident pixels is determined using a filter module in which the plurality of known depth values are used as depth hypotheses.

Referring to 315 of FIG. 3, in one embodiment and as described herein, each unconfident pixel is updated as a confident pixel using said best depth hypothesis. It should be appreciated that the process 300 may be performed repeatedly using one set of confident pixels per unconfident pixel at a time. In another embodiment, process 300 may be performed concurrently on overlapping sets of confident pixels per unconfident pixel. In yet another embodiment, process 300 may be performed concurrently on independent sets of confident pixels per unconfident pixel. In still another embodiment, process 300 may be performed concurrently on overlapping sets of confident pixels per unconfident pixel and on one or more sets of confident pixels per unconfident pixel independent from the overlapping sets.

Thus, embodiments of the present technology enable the enhancement of spatial resolution of an image, thereby reducing a computer's run time and saving resources.

Example Computer System Environment

Figure 4:
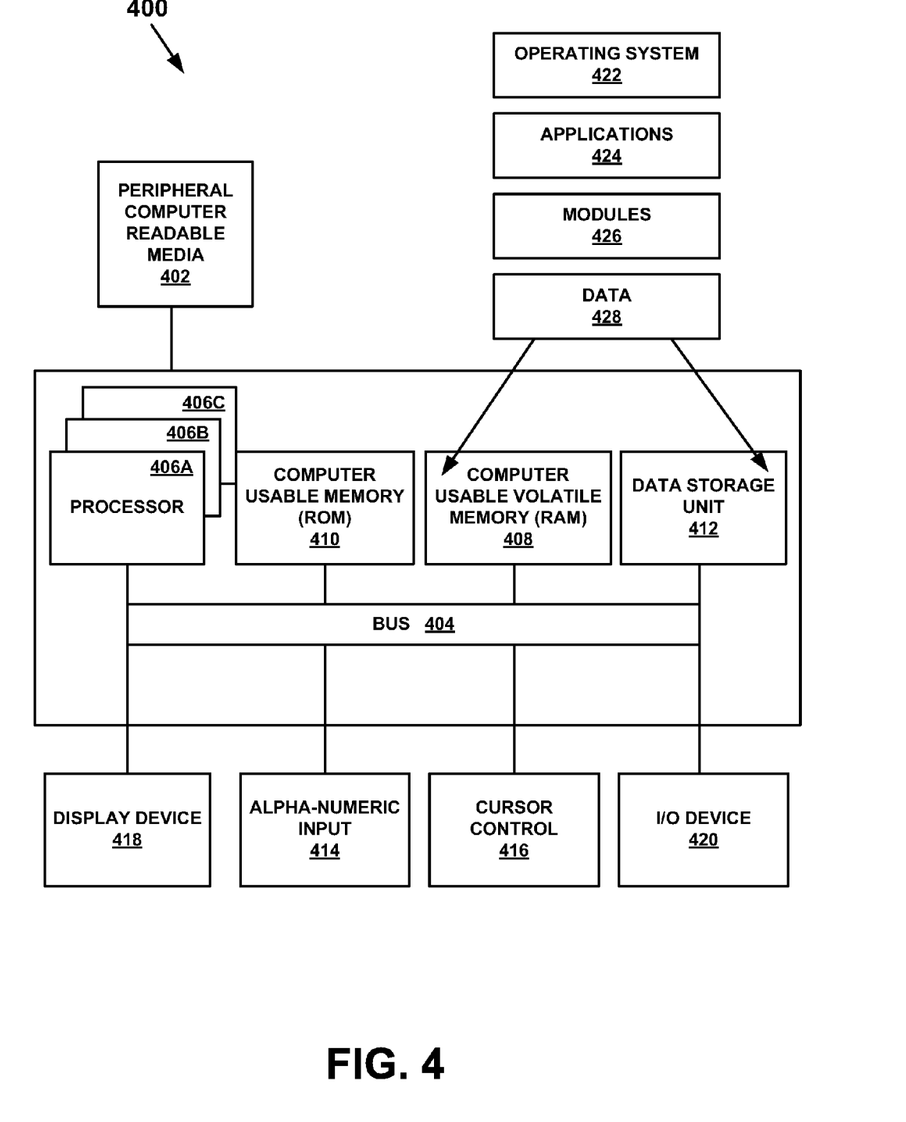
FIG. 4 is a diagram of an example computer system for enhancing spatial resolution of an image, in accordance with embodiments of the present technology The drawings referred to in this description should not be understood as being drawn to scale unless specifically noted.

With reference now to FIG. 4, portions of embodiments of the present technology for enhancing spatial resolution of an image are composed of computer-readable and computer-executable instructions that reside, for example, in computer-usable media of a computer system. That is, FIG. 4 illustrates one example of a type of computer that can be used to implement embodiments, which are discussed below, of the present technology.

FIG. 4 illustrates an example computer system 400 used in accordance with embodiments of the present technology. It is appreciated that system 400 of FIG. 4 is an example only and that embodiments of the present technology can operate on or within a number of different computer systems including general purpose networked computer systems, embedded computer systems, routers, switches, server devices, user devices, various intermediate devices/artifacts, stand alone computer systems, and the like. As shown in FIG. 4, computer system 400 of FIG. 4 is well adapted to having peripheral computer readable media 402 such as, for example, a compact disc, and the like coupled therewith.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alpha-numeric input device 414 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 of the present embodiment also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

System 400 is also well suited to having a cursor directed by other means such as, for example, voice commands. System 400 also includes an I/O device 420 for coupling system 400 with external entities.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the interne. In one embodiment, the present invention, for example, is stored as an application 424 or module 426 in memory locations within RAM 408 and memory areas within data storage unit 412.

Computing system 400 is only one example of a suitable computing environment and is not intended to suggest any limitation as to the scope of use or functionality of the present invention. Neither should the computing environment 400 be interpreted as having any dependency or requirement relating to any one or combination of components illustrated in the example computing system 400.

Embodiments of the present technology may be described in the general context of computer-executable instructions, such as program modules, being executed by a computer. Generally, program modules include routines, programs, objects, components, data structures, etc., that perform particular tasks or implement particular abstract data types. The present invention may also be practiced in distributed computing environments where tasks are performed by remote processing devices that are linked through a communications network. In a distributed computing environment, program modules may be located in both local and remote computer-storage media including memory-storage devices.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for enhancing spatial resolution of an image, said method comprising:
   accessing an image comprising a set of confident pixels and an unconfident pixel positioned adjacent to each confident pixel of said set of confident pixels, said set of confident pixels comprising two to four confident pixels and having corresponding known depth values, said unconfident pixel comprising an unknown depth value;
   determining a best depth hypothesis for said unconfident pixel using a filter module in which the known depth values are used as depth hypotheses, the best depth hypothesis corresponding to a smallest cost volume relative to a plurality of cost volumes corresponding to the depth hypotheses of the two to four confident pixels; and
   updating said unconfident pixel as a confident pixel using said best depth hypothesis.

2. The method of claim 1, further comprising:
   repeating said accessing, said determining, and said updating on an updated image.

3. The method of claim 2, further comprising:
   automatically repeating said accessing, said determining, and said updating on said updated image.

4. The method of claim 1, wherein said accessing an image further comprises:
   increasing a sampling quantity of pixels of an image comprising only confident pixels.

5. The method of claim 1, wherein said determining a best depth hypothesis for said same unconfident pixel using a filter module in which the known depth values are used as depth hypotheses further comprises:
   determining the plurality of cost volumes corresponding to said set of confident pixels utilizing said depth hypotheses.

6. The method of claim 5, further comprising:
   comparing said plurality of cost volumes with each other.

7. The method of claim 6, further comprising:
   based on said comparing, selecting the depth hypothesis associated with the smallest cost volume of said plurality of cost volumes as the best depth hypothesis for said unconfident pixel.

8. A system for enhancing spatial resolution of an image, said system comprising:
   an image receiver configured for receiving an image comprising a set of confident pixels and an unconfident pixel positioned adjacent to each confident pixel of said set of confident pixels, said set of confident pixels comprising two to four confident pixels and having corresponding known depth values, said unconfident pixel comprising an unknown depth value;
   a filter module configured for determining a best depth hypothesis for said unconfident pixel in which the known depth values are used as depth hypotheses, the best depth hypothesis corresponding to a smallest cost volume relative to a plurality of cost volumes corresponding to the depth hypotheses of the two to four confident pixels; and
   an image generator configured for updating said unconfident pixel as a confident pixel using said best depth hypothesis.

9. The system of claim 8, further comprising:
   a repeater configured for accessing an updated image and causing said receiving, said determining, and said updating to be repeated on said updated image.

10. The system of claim 8, further comprising:
    a pixel increaser configured for increasing a sampling quantity of pixels of an image comprising confident pixels.

11. The system of claim 8, wherein said image is a low resolution depth image.

12. The system of claim 8, wherein said known depth values are associated with registered high-resolution color images.

13. The system of claim 8, wherein said filter module comprises:
    a cost volume determiner configured for determining the plurality of cost volumes corresponding to said set of confident pixels utilizing said depth hypotheses;
    a cost volume comparer configured for comparing said plurality of cost volumes with each other; and
    a cost volume selector configured for selecting the depth hypothesis associated with the smallest cost volume of said plurality of cost volumes as the best depth hypothesis for said unconfident pixel.

14. A computer implemented method for enhancing spatial resolution of an image, said method comprising:
    accessing an image, said image comprising a plurality of overlapping sets of confident pixels associated with a plurality of unconfident pixels, each set of said plurality of overlapping sets of confident pixels comprising two to four confident pixels and having corresponding known depth values, said plurality of unconfident pixels comprising unknown depth values;
    determining a best depth hypothesis for each unconfident pixel of said plurality of unconfident pixels using a filter module in which the known depth values are used as depth hypotheses, the best depth hypothesis corresponding to a smallest cost volume relative to a plurality of cost volumes corresponding to the depth hypotheses of the two to four confident pixels; and updating said each unconfident pixel as a confident pixel using said best depth hypothesis.

15. The method of claim 14, further comprising:
repeating said accessing, said determining, and said updating until all unconfident pixels of said image are updated as confident pixels.

16. The method of claim 14, wherein said accessing an image comprises:
accessing a low resolution image.

17. The method of claim 14, wherein said accessing an image further comprises:
increasing a sampling rate of pixels of an image comprising only confident pixels.

18. The method of claim 14, wherein said determining a best depth hypothesis for each unconfident pixel of said plurality of unconfident pixels using a filter module in which the known depth values are used as depth hypotheses further comprises:
determining the plurality of cost volumes corresponding to said set of confident pixels utilizing said depth hypotheses.

19. The method of claim 18, further comprising:
comparing said plurality of cost volumes with each other.

20. The method of claim 19, further comprising:
based on said comparing, selecting the depth hypothesis associated with the smallest cost volume of said plurality of cost volumes as the best depth hypothesis for said unconfident pixel.

* * * * *